United States Patent
Wu

(10) Patent No.: US 8,610,849 B2
(45) Date of Patent: Dec. 17, 2013

(54) LIQUID CRYSTAL PANEL, MANUFACTURING METHOD THEREOF AND LIQUID CRYSTAL DISPLAY

(75) Inventor: Yanbing Wu, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 179 days.

(21) Appl. No.: 13/334,719

(22) Filed: Dec. 22, 2011

(65) Prior Publication Data

US 2012/0162580 A1 Jun. 28, 2012

(30) Foreign Application Priority Data

Dec. 23, 2010 (CN) .......................... 2010 1 0603330

(51) Int. Cl.
*G02F 1/1333* (2006.01)
*G02F 1/1335* (2006.01)

(52) U.S. Cl.
USPC ................................ 349/110; 349/15; 349/96

(58) Field of Classification Search
USPC ........................... 349/110, 15, 96; 445/24, 25
See application file for complete search history.

(56) References Cited

U.S. PATENT DOCUMENTS 5,596,429 A * 1/1997 Kokawa et al. ................. 349/67

FOREIGN PATENT DOCUMENTS

JP 04226425 A * 8/1992 ............ G02F 1/1335

* cited by examiner

*Primary Examiner* — Mike Qi
(74) *Attorney, Agent, or Firm* — Ladas & Parry LLP

(57) ABSTRACT

The disclosed technology relates to a liquid crystal panel, comprising an array substrate and a color filter substrate bonded together with a liquid crystal layer therebetween, wherein, light blocking strips are provided on a surface of at least one of the array substrate and the color filter substrate, and the surface is opposite to the side of the at least one substrate for holding the liquid crystal layer. The disclosed technology also relates to a manufacturing method for the liquid crystal panel and a liquid crystal panel comprising the liquid crystal panel.

18 Claims, 3 Drawing Sheets

LIQUID CRYSTAL PANEL, MANUFACTURING METHOD THEREOF AND LIQUID CRYSTAL DISPLAY

BACKGROUND

Embodiments of the disclosed technology relate to a liquid crystal panel, a manufacturing method thereof and a liquid crystal display.

Liquid crystal displays are a kind of flat panel display commonly in use nowadays, and parallax barrier displays are a kind of most popular stereoscopic display.

Generally, the parallax barrier display is manufactured by disposing a parallax barrier on one surface of the display. FIG. 1 is a cross-sectional diagram of a parallax barrier display in the prior art. As shown in FIG. 1, light blocking strips 12 are fabricated on one surface of a parallax barrier substrate 11. The light blocking strips 12 may be formed of black materials such as black resin or printed films. The location, height and angle of the parallax barrier substrate 11 provided with the light blocking strips 12 are adjusted, and then the parallax barrier substrate 11 is attached onto a display 14 with the surface provided with the light blocking strips 12 facing the display 14. Thus, due to the parallax barrier, one eye of the viewer can only see the odd-number-column pixels or the even-number-column pixels through the slits between the light blocking strips 12. Two images, displayed by the odd-number-column pixels and the even-number-column pixel respectively, are a stereoscopic image pair with parallax. The image seen by the left eye and the image seen by the right eye will be blended by the human brain, and a stereoscopic sense can present before the viewer.

In the prior art, the parallax barrier display is manufactured manually, and the accuracy is hard to be ensured. In addition, there must be an air layer between the parallax barrier and the surface of the display. The air layer can reflect or refract the light, which will deteriorate the displaying quality.

SUMMARY

An embodiment of the disclosed technology provides a liquid crystal panel comprising an array substrate and a color filter substrate bonded together with a liquid crystal layer therebetween, wherein, light blocking strips are provided on a surface of at least one of the array substrate and the color filter substrate, and the surface is opposite to the side of the at least one substrate for holding the liquid crystal layer.

Another embodiment of the disclosed technology provides a liquid crystal display comprising a liquid crystal panel according to any of the embodiments of the disclosed technology.

Still another embodiment of the disclosed technology provides a manufacturing method of a liquid crystal panel, comprising: preparing an array substrate and a color filter substrate separately; and forming light blocking strips on a surface of at least one of the array substrate and the color filter substrate, the surface is opposite to the side of the at least one substrate for holding a liquid crystal layer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the disclosed technology and wherein.

DETAILED DESCRIPTION

Embodiments of the disclosed technology now will be described more clearly and fully hereinafter with reference to the accompanying drawings, in which the embodiments of the disclosed technology are shown. Apparently, only some embodiments of the disclosed technology, but not all of embodiments, are set forth here, and the disclosed technology may be embodied in other forms. All of other embodiments made by those skilled in the art based on embodiments disclosed herein without mental work fall within the scope of the disclosed technology.

Compared with the prior art in which a parallax barrier is disposed at a side of a liquid crystal display, the disclosed technology is different mainly in that light blocking strips are formed on an array substrate and/or a color filter substrate and a stereoscopic displaying effect of the liquid crystal panel is achieved by the light blocking strips.

The disclosed technology can be realized by at least the following two specific solutions.

Solution 1, forming light blocking strips on a surface of the array substrate and/or the color filter substrate directly, and the surface being opposite to the side of the array substrate and/or the color filter substrate for holding a liquid crystal layer.

As for the solution, the light blocking strips are formed by patterning a black matrix material deposited on the surface of the substrate. The patterning process on the black matrix material may employ the normal exposure and development process. After the light blocking strips are formed, a polarization sheet is attached on the substrate. In order to ensure the flatness of the surface for attaching the polarization sheet, a planarization player may also be formed above the light blocking strips before the polarization sheet is attached.

Solution 2, forming light blocking strips on a polarization sheet attached on a surface of the array substrate and/or the color filter substrate directly, and the surface being opposite to the side of the array substrate and/or the color filter substrate for holding a liquid crystal layer.

The temperature at which an exposure and development process is performed is relatively high and the polarization sheet is easily to be damaged; therefore, forming the light blocking strips on the polarization sheet may be performed with black ink by a screen printing or ink-jet method.

Hereinafter, embodiments according to the above two solutions will be described in detail.

Figure 1:
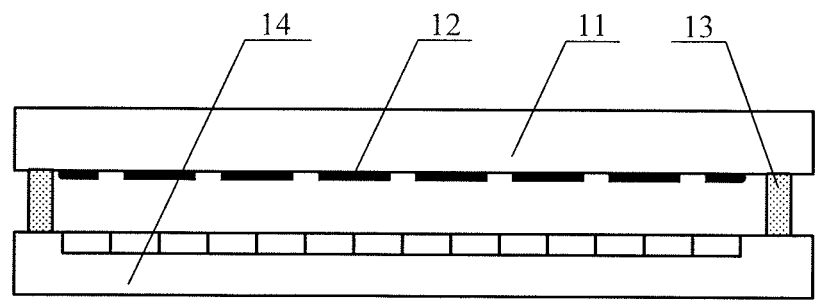
FIG. 1 is a cross-sectional diagram of a parallax barrier display in the prior art.
Figure 2:
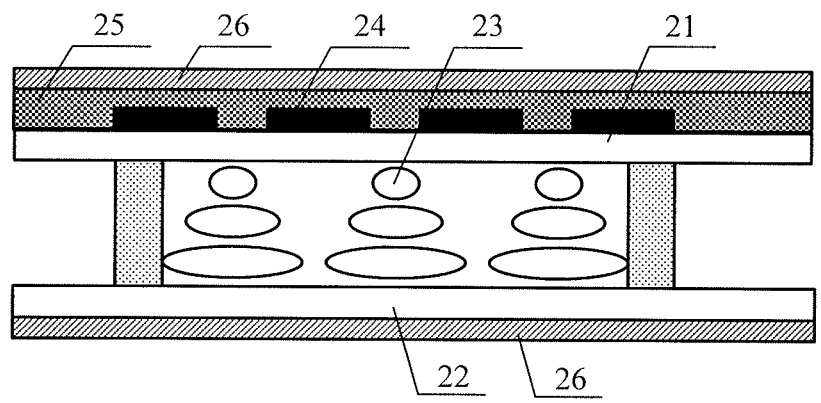
FIG. 2 is a cross-sectional diagram of a liquid crystal panel according to a first embodiment of the disclosed technology.

FIG. 2 is a cross-sectional diagram of a liquid crystal panel according to a first embodiment of the disclosed technology. As shown in FIG. 2, the liquid crystal panel according to the embodiment comprises a color filter substrate 21 and an array substrate 22 bonded together with a liquid crystal layer therebetween. Light blocking strips 24 are directly disposed on a surface of the color filter substrate 21 which is opposite to the side for holding the liquid crystal layer, a planarization layer 25 is disposed above the light blocking strips 24, and a polarization sheet 26 is disposed on the planarization layer 25. The light blocking strips 24 are formed by patterning a light blocking material deposited on the color filter substrate. In addition, a polarization sheet 26 is also disposed on the surface of the array substrate.

It should be noted that the light blocking strips themselves have a very small thickness, e.g., 1 μm, and the light blocking strips only exert a little influence on the flatness of the polarization sheet 26; therefore, alternatively, the planarization layer 25 may not be disposed between the light blocking strips 24 and the polarization sheet 26.

For example, the light blocking strips can be formed with a black matrix material. Specifically, a layer of black matrix material can be deposited on the surface of the color filter substrate in the liquid crystal panel or on the surface of the color filter substrate before it being bonded with the array substrate, and the black matrix material is patterned so as to form light blocking strips with a predetermined pattern.

It should be understood by those skilled in the art that the light blocking strips 24 may also be formed with other materials, for example, chromium metal material and the like, as long as the materials can block light.

After the light blocking strips 24 are formed, a planarization layer 25 can be further formed above the light blocking strips so that the surface for attaching a polarization sheet 26 will be flat. The polarization sheet 26 can be attached on the planarization layer 25. It should be noted that the polarization sheet for the parallax barrier display in the prior art is disposed between the liquid crystal panel and the parallax barrier. However, the polarization sheet is formed above the light blocking strips in the present embodiment. The process for forming the light blocking pattern 24 on the surface of the color filter substrate 21 should be performed at a high temperature, and the polarization sheet is easily to be damaged by the high temperature. However, the polarization sheet 26 is attached after the light blocking strips 24 are formed; therefore, the polarization sheet will not be influenced by the high temperature process.

By the liquid crystal panel according to the embodiment, the viewer can only see a part of pixel columns or a part of pixel rows with one eye through the slits between the light blocking strips 24 and the polarization sheet 26. Thus, two images, formed by the odd-number-column pixels and the even-number-column pixels (or the odd-number-row pixels and the even-number-row pixels) respectively, will form a stereoscopic image pair, which will be blended by the human brain so as to form a stereoscopic image.

As for the stereoscopic liquid crystal panel in the embodiment, the light blocking strips can be formed with a manufacturing process the same as that for the black matrix after the bonding process of the liquid crystal panel or when the color filter substrate is manufactured, therefore, the liquid crystal panel can be manufactured with the current equipments without manual operation, which will make the accuracy for the product be easy to be controlled. Compared with the structure in the prior art, the liquid crystal panel in the embodiment is simple and easy to be realized. In addition, the light blocking strips are formed on the color filter substrate directly instead of attaching a parallax barrier onto the surface of the liquid crystal panel with a double-sided tape as in the prior art; therefore, the reliability and yield will be greatly improved comparing with the structure in the prior art.

Figure 3:
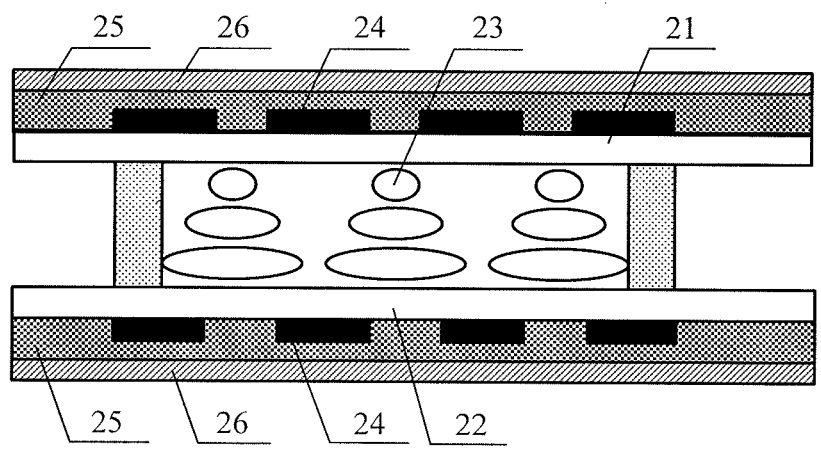
FIG. 3 is a cross-sectional diagram of a liquid crystal panel according to a second embodiment of the disclosed technology.

FIG. 3 is a cross-sectional diagram of a liquid crystal panel according to a second embodiment of the disclosed technology. As shown in FIG. 3, on the basis of the liquid crystal as shown in FIG. 2, the liquid crystal panel according to the present embodiment further have light blocking strips 24 and a planarization layer 25 on the array substrate 22, and a polarization sheet 26 is also disposed on the light blocking strips 24 and the planarization layer 25 on the array substrate side.

As for the liquid crystal panel of the embodiment, compared with the liquid crystal panel in which the light blocking strips are only formed on the color filter substrate as shown in FIG. 2, the light blocking strips are further formed on the array substrate, which improves the stereoscopic displaying effect.

Figure 4:
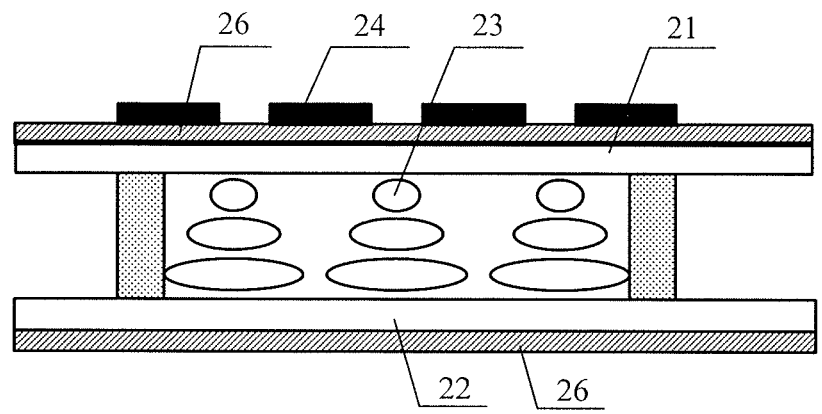
FIG. 4 is a cross-sectional diagram of a liquid crystal panel according to a third embodiment of the disclosed technology.

FIG. 4 is a cross-sectional diagram of a liquid crystal panel according to a third embodiment of the disclosed technology. As shown in FIG. 4, the liquid crystal panel according to the embodiment can be realized by the above Solution 2. Specifically, the liquid crystal panel according to the embodiment comprises a color filter substrate 21 and an array substrate 22 bonded together with a liquid crystal layer therebetween. A polarization sheet 26 is attached on the surface of the color filter substrate 21, and light blocking strips 24 are formed on the polarization sheet 26 directly. The light blocking strips 24 can be formed with black ink by a screen printing or ink-jet method. The screen printing or ink-jet method is a process as known in the prior art, which will not be described in detail.

In addition, in the embodiment, a polarization sheet 26 with light blocking strips may also be disposed on the surface of the array substrate 22, which is similar to that for the color filter substrate 21 and will not be described in detail.

An embodiment of the disclosed technology provides a liquid crystal display which comprises any one of the liquid crystal panels as shown in FIGS. 2, 3 and 4. The technical effect of the liquid crystal display is similar to those described for the liquid crystal panels and will not be described repeatedly.

In order to manufacture the liquid crystal panels as shown in FIG. 2, 3 or 4, an embodiment of the disclosed technology provides a manufacturing method of a liquid crystal panel. The method comprises the processes for preparing an array substrate and a color filter substrate separately, bonding the array substrate and the color filter substrate together and filling liquid crystal layer therebetween. The method further comprises a step for forming light blocking strips on at least one of the color filter substrate and the array substrate, and the surface is opposite to the side of the substrate for holding the liquid crystal layer.

The processes for preparing the array substrate and the color filter substrate separately, bonding the array substrate and the color filter substrate together and filling liquid crystal layer therebetween can be realized by those processes as known in the prior art, which will not be described in detail.

As for the liquid crystal panels as shown in FIG. 2 or 3, a planarization layer is formed above the light blocking strips in order to make the surface of the attached polarization sheet flat. In addition, the light blocking strips may be formed by depositing a black matrix material on the substrate and patterning the black matrix material. In addition, a polarization sheet is attached on the surface of the substrate where the light blocking strips are formed.

As for the liquid crystal panel as shown in FIG. 4, the light blocking strips may be formed with black ink by a screen printing or ink-jet method on the polarization sheet attached on the substrate. Alternatively, the light blocking strips can be firstly formed on a polarization sheet and then the polarization sheet formed with the light blocking strips is attached on the substrate.

In addition, there may be a circuit region at the margin of the array substrate or the color filter substrate. After a liquid crystal cell is formed by bonding the array substrate and the color filter substrate, the liquid crystal will be enclosed at the inner side of the liquid crystal cell through a liquid crystal sealant. However, the step for forming the light blocking strips on the liquid crystal panel needs an exposure and development process, and the developer (developing solution) may erode the circuit in the circuit region of the array substrate or the color filter substrate. Therefore, in order to avoid the liquid crystal panel being polluted by the developer, when the liquid crystal sealant is formed, a protection sealant may be simultaneously applied at the outer side of the liquid crystal sealant so that the circuit region of the array substrate and the color filter substrate is located between the liquid crystal sealant and the protection sealant. Thus, when the development is performed on the liquid crystal panel formed with the liquid crystal sealant and the protection sealant, the developer is blocked outside the protection sealant so that the erosion on the circuit on the array substrate and the color filter substrate by the developer will be avoided.

Hereinafter, an embodiment of a manufacturing method of a liquid crystal panel according to the disclosed technology will be described. It should be noted that the embodiment is only described with a case in which the light blocking strips are formed on the color filter substrate, i.e., the liquid crystal panel as shown FIG. 2. It should be understood by those skilled in the art that the light blocking strips can also be formed on the array substrate similarly, which will not be described in detail.

An embodiment of the method according to the disclosed technology comprises the following steps.

Step 501, preparing an array substrate and a color filter substrate separately.

The manufacturing processes for the array substrate and the color filter substrate are not limited particularly, and can be formed with any method in the prior art.

Step 502, applying a liquid crystal sealant and a protection sealant on the array substrate.

It should be noted that the liquid crystal panel and the protection sealant may also be formed on the color filter substrate. Alternatively, one of the liquid crystal sealant and the protection sealant is formed on the array substrate and the other is formed on the color filter substrate, which will not be limited particularly.

The liquid crystal sealant is similar with those in the prior art, and will not be describe in detail.

The protection sealant can be disposed on the array substrate or the color filter substrate at the outer side of the circuit region, so that the circuit on the array substrate and the color filter substrate will be enclosed at the inner side of the protection sealant.

Step 503, filling a liquid crystal layer at the inner side of the liquid crystal sealant on the array substrate.

In the embodiment, the liquid crystal layer may be filled by a liquid crystal drop method.

Step 504, bonding the array substrate and the color filter substrate formed by the above step so as to form the liquid crystal panel.

Figure 5:
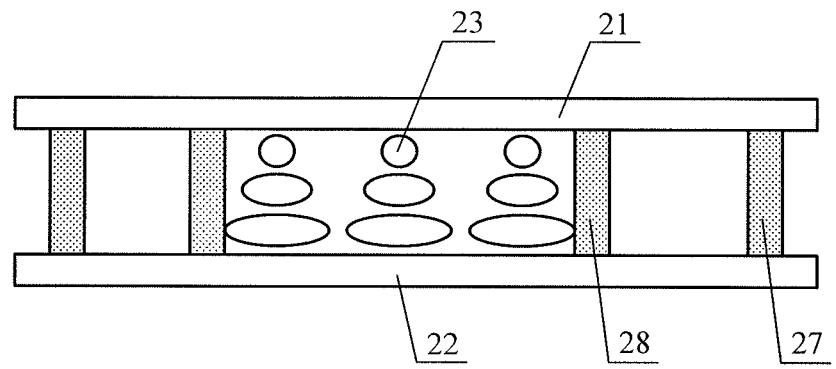
FIG. 5 is a cross-sectional diagram of a structure after an array substrate and a color filter substrate are bonded together in a manufacturing method of a liquid crystal panel according to an embodiment of the disclosed technology.

FIG. 5 is a cross-sectional diagram of a structure after an array substrate and a color filter substrate being bonded together in the manufacturing method of the liquid crystal panel according to the embodiment of the disclosed technology. As shown in FIG. 5, two sealant structures, i.e., the protection sealant 27 and the liquid crystal sealant 28, are formed on the liquid crystal panel, and the circuit regions of the array substrate and the color filter substrate are enclosed at the inner side of the protection sealant.

It should be noted that the liquid crystal can also be injected after the array substrate and the color filter substrate are bonded, which will not be described in detail.

Step 505, depositing a layer of black matrix material on the surface of the color filter substrate of the liquid crystal panel, and then patterning it so as to form light blocking strips.

Figure 6:
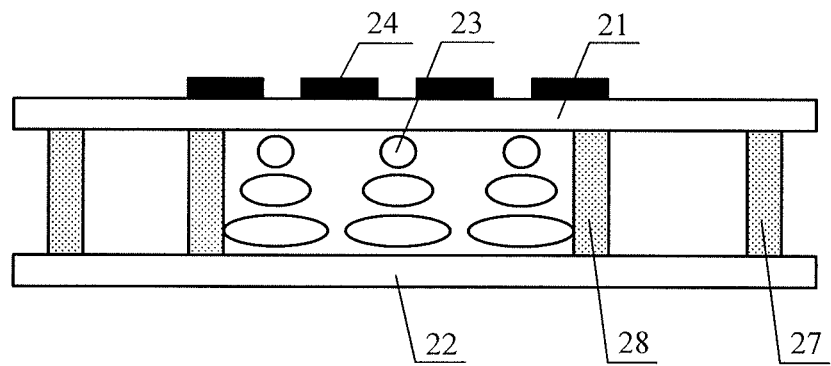
FIG. 6 is a cross-sectional diagram of a structure after light blocking strips are formed on the liquid crystal panel as shown in FIG. 5.

FIG. 6 is a cross-sectional diagram of a structure after light blocking strips being formed on the liquid crystal panel as shown in FIG. 5. As shown in FIG. 6, the light blocking strips 24 can only be formed in the displaying region and may not be formed in other regions. By a mask with an appropriate design, the light blocking strips 24 with desired pattern can be formed. The step can be realized by a process similar to that for forming conductive patterns on a substrate in the prior art, which will not be described in detail.

Due to the presence of the protection sealant, the developer used in the exposure and development process will not flow into the inner side of the protection sealant, so that the circuit at the edge region of the array substrate 22 and the color filter substrate 21 will be protected during forming the light blocking strips 24.

Step 506, forming a planarization layer above the light blocking strips.

Figure 7:
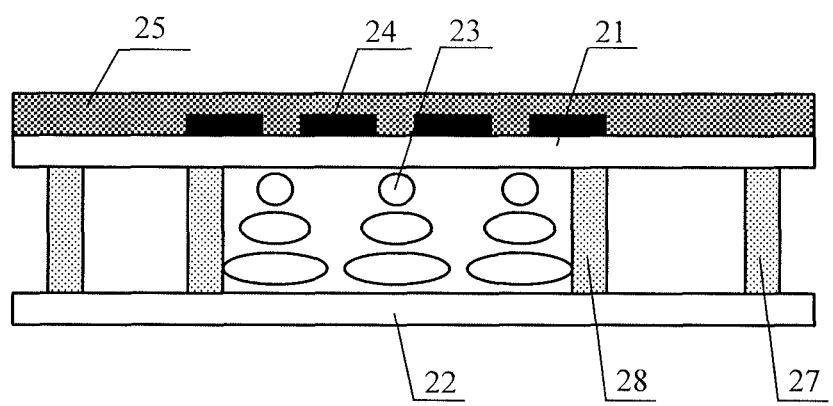
FIG. 7 is a cross-sectional diagram of a structure after a planarization layer is formed on the liquid crystal panel as shown in FIG. 6.

FIG. 7 is a cross-sectional diagram of a structure after a planarization layer is formed on the liquid crystal panel as shown in FIG. 6. As shown in FIG. 7, the planarization layer 25 can fill in the gaps between the light blocking strips 24 so as to form a flat surface.

Step 507, cutting the liquid crystal panel at a location between the protection sealant and the liquid crystal sealant.

Figure 8:
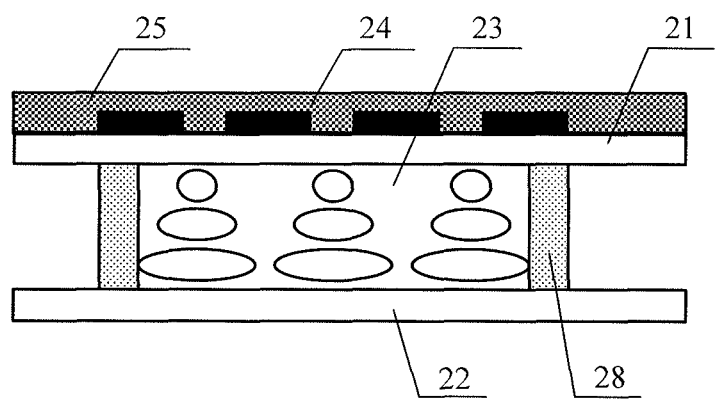
FIG. 8 is a cross-sectional diagram of a structure after the liquid crystal panel as shown in FIG. 7 is cut.

FIG. 8 is a cross-sectional diagram of a structure after the liquid crystal panel as shown in FIG. 7 being cut. As shown in FIG. 8, when the cutting process is performed, the protection sealant 27 have been used for protect the circuit, and the cutting process can be performed at a location between the liquid crystal sealant 28 and the protection sealant 27 so as to form individual liquid crystal panels.

Step 508, attaching polarization sheets on the planarization layer and the array substrate.

After the Step 508, the structure of the liquid crystal panel as shown in FIG. 2 is completed.

As for the liquid crystal panel corresponding to the Solution 2, a polarization sheet can be attached onto at least one substrate among the array substrate and the color filter substrate after the above Step 504, and then light blocking strips can be formed on the polarization sheet. The light blocking strips can be formed by screen printing or spraying a black ink. Alternatively, the light blocking strips can be firstly formed on a polarization sheet and then the polarization sheet formed with the light blocking strips is attached on the substrate. In addition, it is described in the above embodiment that the light blocking strips are only formed on the color filter substrate. However, the light blocking strips can also be formed on the array substrate in a similar manner. Furthermore, it is described in the above embodiment that the light blocking strips are formed after bonding the array substrate and the color filter substrate; however, the light blocking strips can also be formed on the substrates before bonding them together.

As for the manufacturing method according to the embodiment, the light blocking strips can be formed with a manufacturing process the same as that for the black matrix after the bonding process of the liquid crystal panel or when the color filter substrate is manufactured, therefore, the liquid crystal panel can be manufactured with the existing equipments without manual operation, which will make the accuracy for the product be easy to be controlled. Compared with the structure in the prior art, the liquid crystal panel in the embodiment is simple and easy to be realized. In addition, the light blocking strips are formed on the color filter substrate directly instead of attaching a parallax barrier onto the surface of the liquid crystal panel with a double-sided tape as in the prior art; therefore, the reliability and yield will be greatly improved comparing with the structure in the prior art. In addition, by providing a protection sealant, the erosion of the circuit by the developer can be avoided efficiently during forming the light blocking strips so as to ensure the product quality.

It should be noted that the solution according to the embodiments can also be suitable for other flat panel display such as an organic electroluminescence panel, the principle of which is similar with that of the liquid crystal display and will not be described repeatedly.

It can be understood by those skilled in the art that the entire or a part of the method according to anyone of the above embodiments can be performed by hardware, software, or firmware with program. The program can be stored in a computer readable storage medium. When the above program is run, the steps in the above method embodiments can be performed. There are various kinds of storage media which can storage program codes, such as ROM, RAM, magnetic disk, optical disk and the like.

It should be noted that the above embodiments only have the purpose of illustrating the disclosed technology, but not limiting it. Although the disclosed technology has been described with reference to the above embodiment, those skilled in the art should understand that modifications or alternations can be made to the solution or the technical feature in the described embodiments without departing from the spirit and scope of the disclosed technology.

What is claimed is:

1. A liquid crystal panel, comprising an array substrate and a color filter substrate bonded together with a liquid crystal layer therebetween, wherein,
    light blocking strips are provided on a surface of at least one of the array substrate and the color filter substrate, and the surface is opposite to the side of the at least one substrate for holding the liquid crystal layer.

2. The liquid crystal panel of claim 1, wherein the light blocking strips are directly on the surface of the at least one substrate, and a polarization plate is provided on the surface of the at least one substrate where the light blocking strips are formed.

3. The liquid crystal panel of claim 2, wherein a planarization layer is provided between the polarization plate and the surface of the at least one substrate where the light blocking strips are formed.

4. The liquid crystal panel of claim 1, wherein the light blocking strips are formed by patterning a black matrix material deposited on the surface of the at least one substrate.

5. The liquid crystal panel of claim 1, wherein a polarization plate is provided between the light blocking strips and the surface of the at least one substrate, and the light blocking strips are directly on the polarization plate.

6. The liquid crystal panel of claim 5, wherein the light blocking strips are formed with black ink by a screen printing or ink-jet method.

7. A liquid crystal display, comprising the liquid crystal panel of claim 1.

8. A manufacturing method of a liquid crystal panel, comprising:
    preparing an array substrate and a color filter substrate separately; and
    forming light blocking strips on a surface of at least one of the array substrate and the color filter substrate, the surface being opposite to the side of the at least one substrate for holding a liquid crystal layer.

9. The method of claim 8, wherein forming the light blocking strips comprises:
    depositing a black matrix material on the surface of the at least one substrate, and patterning the black matrix material so as to form the light blocking strips.

10. The method of claim 9, further comprising:
    after forming the light blocking strips, forming a planarization layer on the surface of the at least one substrate where the light blocking strips are formed.

11. The method of claim 9, further comprising:
    after forming the light blocking strips, attaching a polarization plate on the surface of the at least one substrate where the light blocking strips are formed.

12. The method of claim 10, further comprising:
    after forming the planarization layer, attaching a polarization plate on the planarization layer.

13. The method of claim 8, further comprising:
    before forming the light blocking strips, attaching a polarization plate on the at least one substrate.

14. The method of claim 13, wherein forming the light blocking strips comprises:
    forming the light blocking strips on the surface of the polarization plate attached on the at least one substrate with black ink by a screen printing or ink jet method.

15. The method of claim 8, further comprising:
    bonding the array substrate and the color filter substrate, and the light blocking strips being formed after the array substrate and the color filter substrate are bonded.

16. The method of claim 15, further comprising:
    before bonding the array substrate and the color filter substrate, applying a liquid crystal sealant and a protection sealant on the array substrate or the color filter substrate, the protection sealant being disposed at the outer side of the liquid crystal sealant and at the outer side of a location corresponding to a circuit region on the array substrate.

17. The method of claim 16, further comprising:
    after forming the light blocking strips, cutting the liquid crystal panel at a location between the protection sealant and the liquid crystal sealant.

18. The method of claim 8, wherein the step of forming light blocking strips comprises:

forming the light blocking strips on a polarization plate, and attaching the polarization plate formed with the light blocking strips on the at least one substrate.

* * * * *